Inventor
Henry G. Ferguson

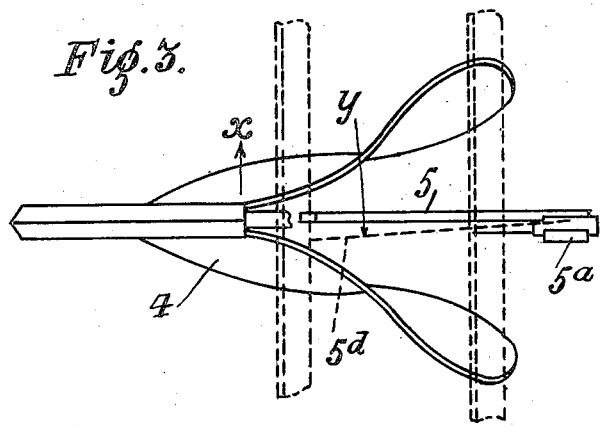
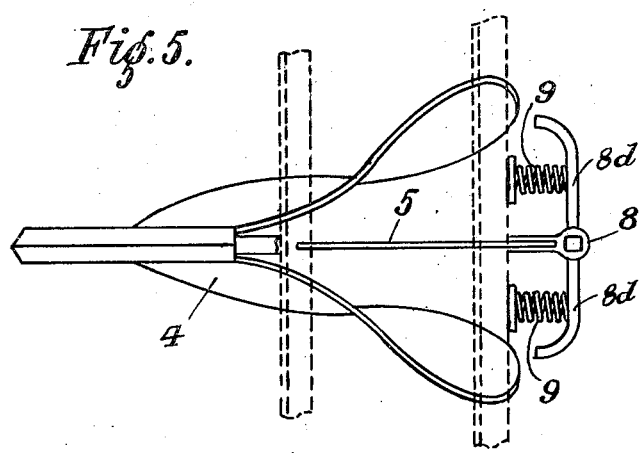
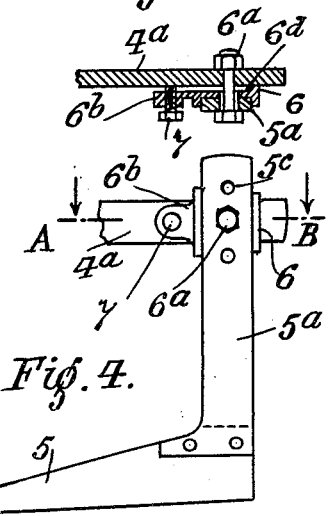
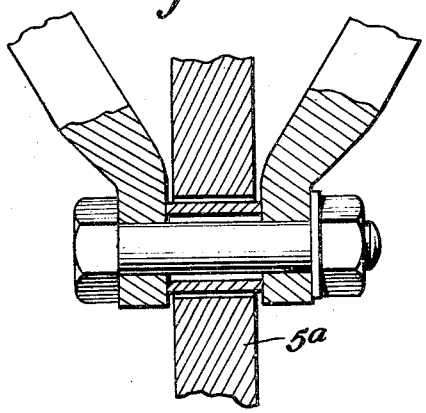

Patented Apr. 2, 1940

2,195,516

UNITED STATES PATENT OFFICE 2,195,516

STEERING MEANS FOR AGRICULTURAL IMPLEMENTS

Henry George Ferguson, Belfast, Northern Ireland

Application January 22, 1937, Serial No. 121,878
In Great Britain February 5, 1936

24 Claims. (Cl. 97—47)

This invention relates to agricultural implements, and has for its object to provide for their better operation when working on undulating or uneven ground or on hillsides or other ground where the implement has a tendency to fall away from a straight draft.

Heretofore endeavours have been made by the use of fins, rudders or discs to keep such implements as cultivators following in a straight line behind the draft means. These fins, rudders or discs or equivalent (hereinafter for convenience referred to as fins) as hitherto used were connected rigidly to the implement, being intended to counter side thrust on the implement caused, for example, when going across a hillside, or when one side of the implement might be deeper than the other causing an unbalanced load on the implement. These fins failed to keep the implement following in a straight line behind the draft means. All implements swing laterally about a point ahead of the implement, with the result that the rear end of such fins would swing faster than the front end. The result of this was to tend to twist the fin in a direction which would reduce the efficiency of the fin in its object of keeping the implement in a straight line behind the draft means.

An object of the invention is to provide means adapted to have an automatic self-centering action on the implement to correct any falling away of, or deflection of, the implement due to an unbalanced load thereon characterised by a ground-engaging member so made and/or mounted on the implement that when the implement is deflected from its normal position or path the said member restores the implement to said position or path. This may be done, for example, by attaching the fin, or equivalent, to its supporting member at or near its rear end, so that if, for example, the implement tends to get out of alignment with its draft means on a hillside or tends to be deflected by an unbalanced load, the tendency will be to swing or twist the fin around its supporting point, which, being at the rear, thus inclines the fin at an angle which tends automatically to correct any falling away of the implement or deflection thereof and thereby keeps it following in a straight line behind the draft means.

In accordance with a further object the fin, or equivalent, would preferably have vertical adjusting means for regulating its depth and its position on the implement. A further object is to connect the fin or equivalent with the implement in such manner that it can be operated by hand for the purpose of steering the implement from the tractor, from the implement itself, or from behind the implement, and a further object is to provide adjustment means for adjusting the angle of the fin laterally relative to the implement.

A further object of the invention is to provide automatic self-centering means in combination with an implement whose working depth is regulated by a power device on the tractor controlled by the draft pressure on the implement, the said means serving to guide the implement instead of the usual land wheels which have to be dispensed with to allow the depth regulation to take place.

A further object of the invention is to provide automatic self-centering means in combination with an implement which is attached to the tractor by laterally spaced links universally attached to the tractor and the implement, and so disposed as to allow the implement to swing laterally with reference to the tractor about a point other than the actual point of connection and to follow closely the steering of the tractor, the said means serving to guide the implement instead of the usual land wheels which have to be dispensed with to allow said lateral swinging movement.

A still further object of the invention is to provide said automatic self-centering means in combination with an implement which is attached to the tractor by vertically spaced links universally attached to the tractor and the implement, and so disposed as to cause a line of draft tending to hold the implement in the ground. Such links allow relative vertical movement between the tractor and implement and the said centering means are such as to offer no substantial resistance to said movement, such as would be offered by the usual land wheels, but which offer substantial resistance to lateral movement of the implement in the soil.

The invention will now be described by way of example only, with reference to the accompany drawings wherein:

Fig. 3 is a plan view of the plough and fin.

Fig. 4 is a detail view showing how a fin, in accordance with the invention, is provided with means for angling the fin relatively to the implement.

Figure 1:
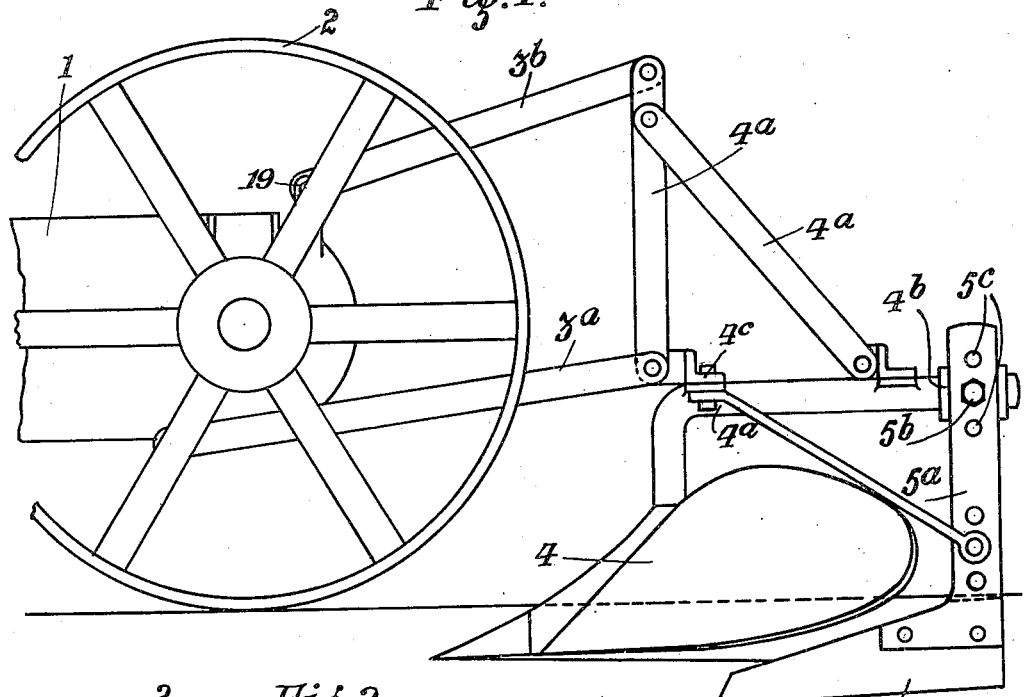
Fig. 1 is a side elevation of the back of a tractor with the implement, in this case, a ridging plough, attached thereto and a fin, in accordance with the invention, attached to the plough frame.
Figure 2:
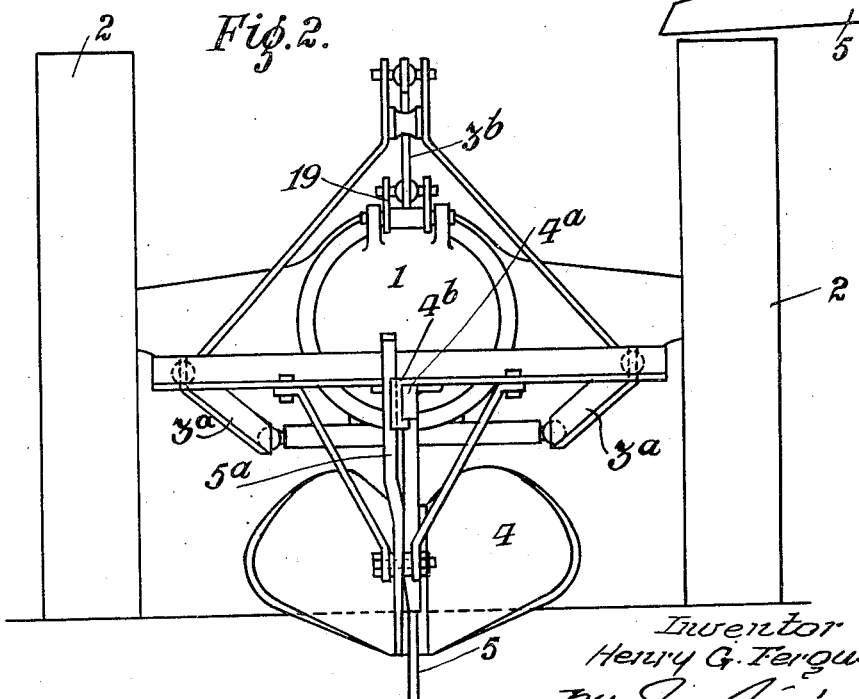
Fig. 2 is a rear view corresponding to Fig. 1.

Fig. 4ᵃ is a sectional plan view on the line A—B, Fig. 4.

Fig. 5 is a plan view corresponding to Fig. 3 but showing a swivelling fin with spring means adapted to exert pressure against deflection of the fin.

Fig. 6 is a sectional detail showing the connection between the stays and the fin.

The rear of the tractor is denoted by the numeral 1 and is provided as usual with the two driving, ground-engaging wheels 2. The plough 4 has a framework 4ᵃ connected to the rear 1 of the tractor by the upper link 3ᵇ and laterally spaced two lower links 3ᵃ more fully described hereinafter. At the rear of the framework 4ᵃ a fin 5 is connected by its upwardly projecting stem 5ᵃ which is held by a bolt 5ᵇ in a vertical channel in the seat member 4ᵇ. This seat member has a horizontal channel on its outer face which engages the rearwardly projecting horizontal element of the framework 4ᵃ and is held in this position by the bolt 5ᵇ. The stem 5ᵃ is attached to the fin 5 at the rear end thereof and three vertically spaced holes 5ᶜ are provided in the stem so that by passing the bolt 5ᵇ through any selected hole the fin can be adjusted vertically. Any desired angular and/or lateral translational adjustment of the fin 5 as regards fore and aft alignment with the implement may be effected by inserting shims of tapering and/or uniform cross section between the stem 5ᵃ and the seat 4ᵇ or the latter and the rearwardly projecting horizontal element of the framework 4ᵃ, at 4ᵇ, or at 5ᶜ, or angular adjustment may be provided for by providing a screw or other adjustment whereby the fin can be angled to the desired extent. An example of an arrangement enabling such angular adjustment is shown in Figs. 4 and 4ᵃ. The fin stem 5ᵃ is clamped to its seat 6 by means of the bolt 6ᵃ. An extension 6ᵇ of the seat 6 carries a screwed stud 7 the point of which bears on the implement frame 4ᵃ. By screwing the stud 7 in, or out, the desired angular adjustment of the fin 5 relative to the implement can be effected the bolt 6ᵃ having previously been loosened. The seat 6 bears against the frame 4ᵃ by means of the flange 6ᵈ.

In the example shown at Fig. 5 the fin 5 is attached to the plough framework by a vertical pivot 8 and is normally maintained in central position by the action of springs 9, located between, and attached to, the arms 8ᵈ of the fin and a rear horizontal element of the plough framework. By this arrangement the springs 9 respectively exert a centering pressure and pull against any force which may be caused by any unbalanced load on the implement. Thus a deflection of the fin will only occur when an excessive pressure, or load, occurs on one side or other of the fin due to the implement commencing to stray to one side or the other. The springs 9 thus return the fin to its normal position when the aforesaid deflecting force ceases or is reduced.

The following is a description of the automatic self-centering action of the fin and is applicable to any of the embodiments described above. If the implement 4 moves forward in a straight line without any falling away or deflection the fin 5 will keep in alignment with the implement because the soil pressure on either side of the fin is equal. If, however, on a hill-side, for example, the implement tends to fall down the hill in the direction of the arrow X, Fig. 3 this will increase the pressure on the lower side of the fin and angle it as shown by the dotted line 5ᵈ in Fig. 3, the angular movement being permitted by the stem 5ᵃ which is more or less resilient. In Fig. 5 the pivotal connection allows the angular movement which is resisted by the springs. Then as the implement continues to move forward the angled fin as it is pulled through the earth will be subjected by the latter to a lateral pressure which will overcome or balance the force or pressure tending to force the implement from the correct path. As the load on the lower side of the fin 5 decreases due to the implement being brought back to the correct path, the fin will be moved back by the resilient stem or the springs 6 and automatically resume its normal central position with reference to the implement.

If desired, I may provide for lateral rigidity without any decrease of resilience of the fin by providing stays from the stem 5ᵃ to the frame 4ᵃ of the implement, the stem in this case being rigid and the angular movement being made possible by the resilient nature of the fin.

The fin, or equivalent can be, and preferably is, used in combination with the means for attaching agricultural implements to tractors, as described in my Patents Nos. 1,916,945 and 1,464,130.

It is to be understood that whilst the fin has been described and shown with reference to a ridging plough, it may be applied to any implement which may require a self centering action.

I claim:

1. For an agricultural implement a ground-engaging member and means for attaching said member to the implement so as to be capable of deflection, as a result of lateral soil pressure thereon caused by the implement tending to leave the correct path, said deflection being with reference to the implement and being about a point nearer the rear than the front of said member.

2. Automatic steering means for an agricultural implement comprising a ground-engaging fin and resilient means for attaching same to the implement so as to be capable of deflection with reference to the implement about an axis near the rear of said fin.

3. Means for automatically keeping an agricultural implement in the normal path comprising a forwardly projecting ground-engaging fin and a resilient stem thereon attachable to the implement so that the fin is capable of deflection with reference to the implement about an axis nearer the rear than the front of the fin.

4. An agricultural implement with means for automatically correcting lateral swing comprising a ground-engaging fin, a pivotal attachment between said fin and the implement allowing pivotal movement of the fin with reference to the implement about an axis nearer the rear than the front of the fin, and spring means for resisting pivotal movement of the fin to either side with reference to the implement.

5. Means for automatically keeping an agricultural implement in the normal path comprising a forwardly projecting ground-engaging fin and a resilient stem thereon, means for attaching the stem to the implement so that the fin is in alignment with the path of the implement and is capable of deflection with reference to the implement about an axis nearer the rear than the front of the fin, and means for angularly adjusting the normal position of the fin with reference to the implement.

6. Means for automatically correcting lateral drift of an agricultural implement comprising a forwardly projecting ground-engaging fin, a resilient upwardly projecting stem at the rear thereof and means for attaching said stem to the implement.

7. Means for automatically correctly lateral drift of an agricultural implement comprising a forwardly projecting ground-engaging fin, a resilient upwardly projecting stem at the rear thereof, a seat member in which said stem engages and which engages the implement, and means for vertically adjusting the stem in said seat.

8. Means for automatically correcting lateral drift of an agricultural implement comprising a forwardly projecting ground-engaging fin, a resilient upwardly projecting stem at the rear thereof, a seat member in which said stem engages and which engages the implement, and screw means for angularly adjusting said seat with reference to the implement.

9. Means for automatically correcting lateral drift of an agricultural implement comprising a forwardly projecting ground-engaging fin, a resilient upwardly projecting stem at the rear thereof, a seat member in which said stem engages and which engages the implement and shims for laterally adjusting said stem with reference to the implement.

10. Automatic steering means for an agricultural implement comprising a resilient ground-engaging fin and means for attaching same to the implement so as to be capable of deflection about an axis nearer the rear than the front of the fin.

11. Means for automatically correcting lateral drift of an agricultural implement comprising a forwardly projecting ground-engaging fin, an upwardly projecting member at the rear pivotally attached to the implement, an arm on said member and spring means engaging said arm to keep the fin normally in alignment with the path of movement of the implement.

12. A ground-engaging member for an agricultural implement, which member is adapted to engage in the soil and which, when the implement tends to fall away or be deflected from the correct path, is automatically moved at the leading edge relatively to the implement in the opposite direction to that of the falling away or deflection of the implement solely due to the unbalanced soil pressure thereon arising from the tendency of the implement to fall away, so as automatically to correct said falling away or deflection of the implement from the correct path.

13. Automatic steering means for an agricultural implement comprising a ground-engaging part adapted to be moved solely by the lateral soil pressure thereon caused when the implement tends to leave the correct path, and adapted by means of said movement to correct the tendency of the implement to leave the correct path.

14. In combination a tractor, an agricultural implement, a hitch connection between the tractor and implement comprising spaced elements allowing lateral swinging of the implement with reference to the tractor, and automatic steering means for the implement comprising a ground-engaging fin and resilient means for attaching same to the implement so as to be capable of deflection with reference to the implement about an axis near the rear of said fin.

15. In combination a tractor, an agricultural implement, means for attaching the implement to the tractor comprising spaced connecting members universally attached to the tractor and to the implement, said members permitting free lateral and vertical movement of the implement relative to the tractor when in operation, the member being so spaced that in operation free lateral swinging of the implement is permitted relative to the tractor about centres within a relatively small area located apart from the actual connection between the tractor and implement, and automatic steering means for the implement comprising a ground-engaging fin and resilient means for attaching same to the implement so as to be capable of deflection with reference to the implement about an axis near the rear of said fin.

16. In combination a tractor, an agricultural implement, means for attaching the implement to the tractor comprising links universally connected to the implement and the tractor and so laterally spaced that their connections to the tractor are closer than their connections to the implement, and automatic steering means for the implement comprising a ground-engaging fin and resilient means for attaching same to the implement so as to be capable of deflection with reference to the implement about an axis near the rear of said fin.

17. In combination a tractor, an agricultural implement, means for hitching the implement to the tractor comprising upper and lower members movably connected to the tractor and to the implement so as to permit relative movement therebetween during operation, said members being arranged so as to cause the effective line of draft to be from a position other than that of the actual connection between the tractor and the implement, and automatic steering means for the implement comprising a ground-engaging fin and resilient means for attaching same to the implement so as to be capable of deflection with reference to the implement about an axis near the rear of said fin.

18. In combination a tractor, an agricultural implement, means for hitching the implement to the tractor comprising upper and lower link elements universally connected to the tractor and implement and allowing relative vertical movement therebetween and so spaced that the effective line of draft tends to keep the implement in the ground, and automatic steering means for the implement comprising a ground-engaging fin adapted to offer no substantial resistance to said movement and resilient means for attaching same to the implement so as to be capable of deflection with reference to the implement about an axis near the rear of said fin.

19. In combination a tractor, an agricultural implement, means for connecting the implement to the tractor comprising two laterally spaced convergent links, universal means for connecting said links to the tractor, a link which is vertically spaced from said first links and is forwardly convergent with respect thereto, universal means for connecting said link to the tractor and the implement, and automatic steering means for the implement comprising a ground-engaging fin and a resilient connection between same and the implement so that the fin is capable of deflection with reference to the implement about an axis near the rear of said fin.

20. Automatic steering means for an agricultural implement comprising a ground-engaging fin and resilient means between same and the implement so that the fin is capable of deflection with reference to the implement about an axis near the rear of said fin.

21. In combination a tractor, an agricultural implement, a hitch connection between the tractor and implement comprising spaced elements allowing lateral swinging of the implement with reference to the tractor, and automatic steering means for the implement comprising a ground-engaging member and means for attaching said member to the implement so as to be capable of deflection as a result of lateral soil pressure thereon caused by the implement tending to leave the correct path, said deflection being with reference to the implement and being about a point nearer the rear than the front of said member.

22. In combination a tractor, an agricultural implement, means for hitching the implement to the tractor comprising upper and lower members movably connected to the tractor and to the implement so as to permit relative movement therebetween during operation, said members being arranged so as to cause the effective line of draft to be from a position other than that of the actual connection between the tractor and the implement, a ground-engaging member and means for attaching said member to the implement so as to be capable of deflection as a result of lateral soil pressure thereon caused by the implement tending to leave the correct path, said deflection being with reference to the implement and being about a point nearer the rear than the front of said member.

23. In combination a tractor, an agricultural implement, means for hitching the implement to the tractor comprising spaced elements allowing lateral swinging of the implement with reference to the tractor about centers within a relatively small area located apart from the actual connection between the tractor and the implement and arranged to cause the effective line of draft to be from a position other than that of the actual connection between the tractor and the implement, a ground-engaging member and means for attaching said member to the implement so as to be capable of deflection as a result of lateral soil pressure thereon caused by the implement tending to leave the correct path, said deflection being with reference to the implement and being about a point nearer the rear than the front of said member.

24. In combination a tractor, an agricultural implement, means for hitching the implement to the tractor comprising upper and lower link elements universally connected to the tractor and implement and allowing relative vertical movement therebetween and so spaced that the effective line of draft tends to keep the implement in the ground, a movable member on the tractor connected to a link element and adapted to receive through same a force in proportion to the draft on the implement and be moved in accordance with said force to cause raising or lowering of the implement in accordance with the draft pressure thereon, and automatic steering means for the implement comprising a ground-engaging fin adapted to offer no substantial resistance to said movement and resilient means for attaching same to the implement so as to be capable of deflection with reference to the implement about an axis near the rear of said fin.

HENRY GEORGE FERGUSON.